March 30, 1937. A. ABRAMS ET AL 2,075,327
HORTICULTURAL BINDING TAPE
Filed March 19, 1936
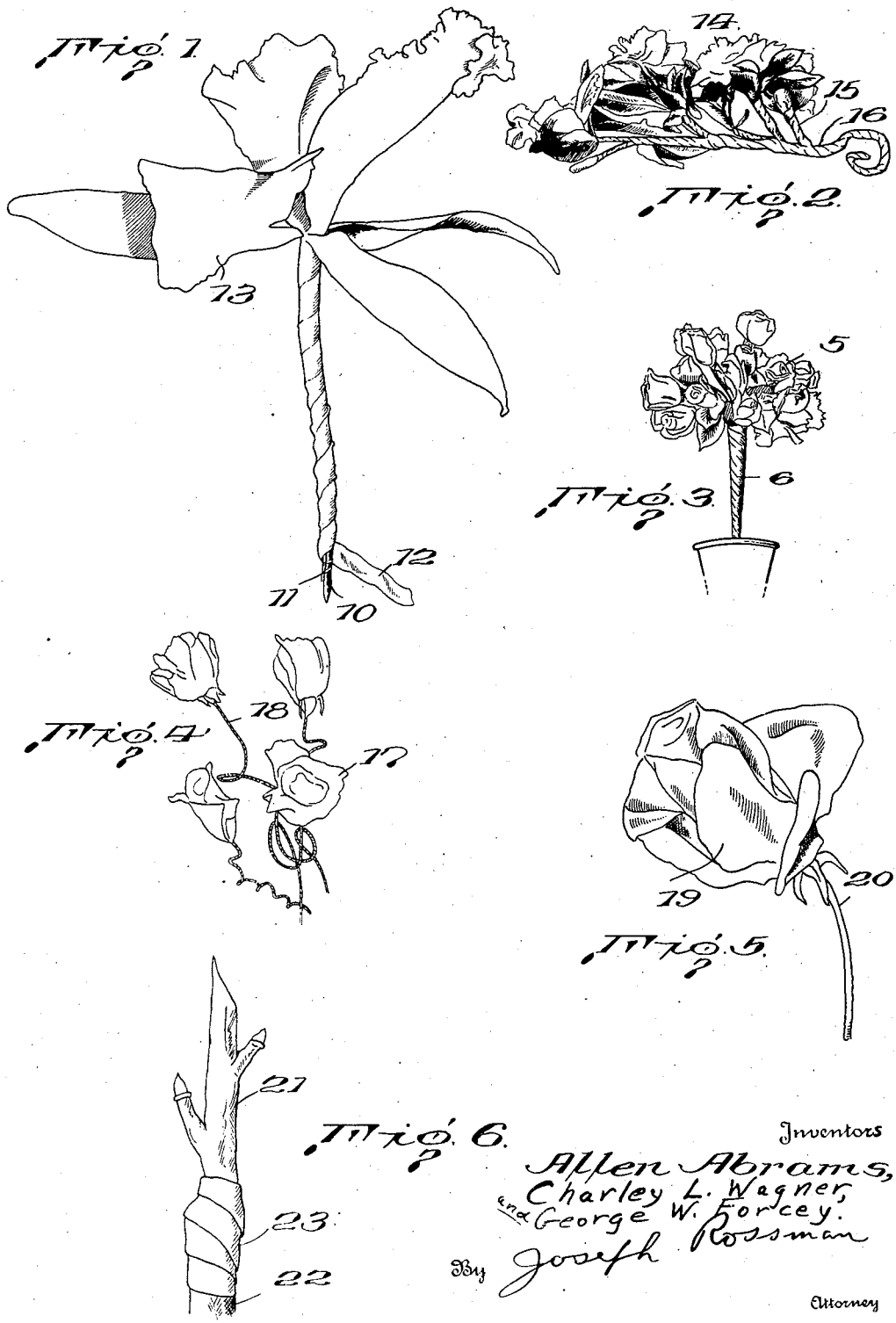

Patented Mar. 30, 1937

2,075,327

UNITED STATES PATENT OFFICE 2,075,327

HORTICULTURAL BINDING TAPE

Allen Abrams, Charley L. Wagner, and George W. Forcey, Wausau, Wis., assignors to Marathon Paper Mills Company, Rothschild, Wis., a corporation of Wisconsin Application March 19, 1936, Serial No. 69,730

15 Claims. (Cl. 47—1)

This invention relates to binding tape for horticultural wrapping purposes. One of the objects of this invention is to provide a novel tape suitable for binding and sealing purposes in horticultural work.

A further object of this invention is to provide a binding tape suitable for making floral displays, bouquets, wreaths and other floral decorations.

Another object of the invention is to provide a flexible horticultural tape made from a wax-rubber composition.

Other and further objects of the invention will be apparent from the disclosures in the accompanying drawing and the following specification.

On the drawing:

Figure 1 represents a flower having a wire reinforced stem wrapped with our florists' tape.

Figure 2 represents a shoulder bouquet finished with our tape material.

Figure 3 represents a floral display wherein the stems are wound with our sheet material to form a trunk.

Figure 4 represents flowers supported on ordinary floral wire spirally wrapped with our novel tape.

Figure 5 represents an artificial flower made from our thermoplastic sheet material.

Figure 6 is a view of a stock grafted and protected with our binding tape.

In forming our novel binding tape we have found that it is possible by adding suitable binders under controlled conditions to certain thermoplastic substances which are brittle and not flexible at ordinary temperatures to render such thermoplastic substances pliable and flexible to a remarkable degree so that they can be converted into a flexible tape. We have, for example, discovered that substances such as paraffin wax or certain types of asphalt which are brittle and not flexible at ordinary temperatures can be rendered pliable and flexible by adding thereto certain binders such as rubber, gutta percha, "Viskanol", (a straight hydrocarbon produced by suitably polymerizing some of the unsaturated hydrocarbon gases produced in cracking petroleum) and similar binding agents.

We have also found that by properly controlling the proportions and compounding conditions, we can uniformly produce compositions having a desired predetermined viscosity and cohesiveness whereby they can be employed for conversion directly into self-sustaining sheets, films or tapes.

The major ingredient or body of our composition thus consists essentially of a thermoplastic substance which is not flexible or pliable at ordinary temperatures. Such body substance is furthermore solid at normal temperatures, but liquefies at higher temperatures, is insoluble in water and acts as a dispersing medium or solvent for the binder which is added thereto. Any substance having the aforementioned properties can be used for our invention, as, for example, paraffin-wax, beeswax, spermaceti, asphalt, etc.

The binder which we add to our body portion is thermoplastic, insoluble in water and solid at ordinary temperatures. It is furthermore elastic, flexible and has strong adhesive properties. It is dispersible or soluble in the body portion. Any natural or synthetic substances having the aforementioned properties may be used as our binder, as, for example, rubber, balata, gutta percha, "Viskanol" or other artificial gummy or rubber-like substances.

A specific embodiment of our composition adapted for conversion into flexible sheets, films, or tapes comprises a composition of rubber, or a rubber-like substance, and a wax, or a wax-like substance. Suitable rubber and rubber-like substances include pale crepe rubber, smoked sheet rubber, vulcanizable rubbers generally and gutta percha. We have successfully used paraffin-wax, beeswax, spermaceti, and other waxes, in the preparation of our composition. However, pale crepe rubber and paraffin-wax are the ingredients which we prefer to use, for producing a substantially colorless and tasteless product.

The proportion of pale crepe rubber to paraffin-wax may, in general, vary between 6% rubber, 94% paraffin-wax and 30% rubber, 70% paraffin-wax by weight. Using other rubber-like and wax-like substances the proportions should be so chosen as to give suitable viscosities of at least 8000 secs. (50 cc. at 90° C. measured on Scott viscosimeter).

The following will illustrate a preferred composition of our invention and a preferred method of preparing the composition:

| | Per cent by weight |
|---|---|
| Paraffin-wax, melting point between 120 and 180° F | 85 to 88 |
| Pale crepe rubber, 0.020 to 0.050 inches in thickness | 15 to 12 |

The composition must be prepared under carefully regulated conditions which we have determined by long study and experimentation. The paraffin-wax is first melted by heating in a jacketed vessel, preferably provided with a kneader type of stirrer, to a temperature of about 200—

210° F. The individual sheets of rubber are then carefully added to the bath so that the surfaces are completely wetted with the molten paraffin as they are being immersed in the bath so as to avoid sticking and welding of the rubber sheets to each other in the bath.

During the addition of the rubber the temperature of the bath is permitted to drop to 180° to 190° F. and is maintained at this temperature throughout the compounding operations. After all the rubber has been added the bath is gently stirred with a paddle so as to permit thorough penetration of the paraffin into the rubber and to prevent lumping of the rubber during solution. This stirring operation is continued for about fifteen minutes until the rubber sheets are adequately soaked.

The mixture is then stirred mechanically in a kneader type of mixer until the batch is free of lumps of undissolved rubber. This operation requires 1½ to 2 hours. The temperature of the mass is maintained at 180° to 190° F. during the entire period. At the end of this time any undissolved lumps may be strained out, broken up and returned. However, this is not ordinarily necessary. The composition so prepared is then ready for direct conversion into thin films.

Various pigments or other coloring matters, fillers, antioxidants and the like, may be incorporated, either directly or by means of a master batch, into the rubber-wax mixture, depending upon the type of pigment, filler or added ingredient to be incorporated. If a white composition is desired, for example, a white pigment such as titanium dioxide, or mixtures of titanium dioxide with either calcium sulphate or barium sulphate may be incorporated into the composition.

We have also found that it is possible to vulcanize our rubber-paraffin wax composition at practically any temperature between say 70° and 300° F. as disclosed in our copending application Serial No. 40,765, now Patent No. 2,054,115, September 15, 1936. However, if such mixtures are vulcanized or even partially vulcanized before being formed into films the entire composition becomes highly viscous and attains a gelled condition so that it cannot be satisfactorily sheeted out or used to coat or laminate fabrics. It is therefore necessary to first form the self-sustaining film and then to vulcanize the composition.

We have found that high vulcanizing temperatures cannot be employed for our preformed films as the film loses its original characteristics and becomes distorted on account of the effect of the high temperature on the composition. It is therefore desirable to vulcanize the films or sheets at low temperatures after being formed. We have found that this can be readily effected by the use of super-accelerators which permit self-curing after the film is formed. For this purpose we may use the "split batch" method of compounding our ingredients, although it is also possible to combine all the ingredients in one batch.

Examples of super accelerators that can be satisfactorily used are the following:

"Butyl zimate"—a zinc salt of dibutyl dithiocarbamate

"Zimate"—zinc dimethyl dithiocarbamate

"R-2"—the reaction product of carbon bisulphide and methylene dipiperidine

"ZBX"—zinc butyl xanthate

"552"—piperidine pentamethylenedithiocarbamate.

To avoid vulcanization when subjected to the high temperatures required for the film forming operation, two batches are prepared one containing the vulcanizing agent and activator or pigment and the other containing the accelerator are mixed just before the film is to be formed. The final batch is made in such quantities that it will not gel within the normal operating time for using it up even at the temperatures occurring during the film forming operation. Thereafter, notwithstanding the relatively low temperatures prevailing during the storage of the product, the accelerators are effective in bringing about vulcanization in a period, say, of up to several weeks.

The final batch of rubber-wax composition may have the following proportions by weight of materials:

| | Per cent |
|---|---|
| Accelerator | ½ |
| Sulphur | ½ |
| Zinc oxide | ½ |
| Paraffin-wax (m. p. 130-2° F.) | 83½ |
| Pale crepe rubber | 15 |

When a milder cure is desired the proportions of accelerator and vulcanizing agent used are reduced. For example, in the final batch of the aforementioned example, the accelerator may be reduced to ⅛% and the sulphur to ¼%. This freshly prepared composition can be kept at not over 180° F. and used any time within eight to ten hours after it is compounded, without gelling sufficiently to render it workable.

Where transparency is desired it is preferable to use zinc carbonate instead of zinc oxide in the above composition.

The vulcanized film will shrink in the grain direction much less than the unvulcanized film when subjected to elevated temperatures and will more successfully resist the action of ultra-violet light and will still retain its self-sustaining properties at elevated temperature. The vulcanized film is also more resistant to solvents than the unvulcanized film. However, the vulcanized film has lost its ability to "heat-seal" to itself, to paper and other sheet materials which is desirable for some purposes. These properties may be increased or diminished in degree by controlling the degree of vulcanization.

Antioxidants may be incorporated into our rubber-paraffin-wax composition whether it is to be vulcanized or not. We have found the following antioxidants suitable: hydroquinone, pyrogallol, para-hydroxy-phenyl morpheline, aniline-beta-naphthol.

The addition of these antioxidants, age resistors or photo-chemical inhibitors increases the resistance of the finished sheet or film to the action of light and air.

Where it is desired to make the film more sticky, up to 15% of a gum or resin, such as rosin, may be added to replace an equal weight of wax. Similarly, the gloss may be improved and a harder film produced by the addition of a hydrogenated vegetable oil, such as cottonseed, in amounts up to, say, 15% by weight, to replace an equal weight of wax.

During mixing and before the final rubber-paraffin wax batch is ready to be supplied to the film forming machine, it is subjected to a vacuum of 15 to 20 inches of mercury, preferably as high as is practical of attainment, to eliminate air from the batch and prevent its inclusion in the film.

We have also succeeded in preparing flexible, self-sustaining films from compositions consisting of asphalt and rubber. In preparing such compositions, we may, for example, take 7½ parts of rubber and dissolve same in 42½ parts of paraffin-wax. This mixture is then added to 50% parts of asphalt (Paradura), which has been melted and heated to about 350° F. The composition is intimately mixed and can be formed into a film which is non-tacky and flexible by sheeting out on a chilled forming roller similar to the method used in making films from rubber-wax compositions. The asphalt in its original state is brittle and not flexible but by the addition of the rubber binder to same, it becomes flexible and can be formed into a self-sustaining film.

We have also prepared compositions comprising asphalt and 10% by weight of rubber from which we have formed self-sustaining sheets or films. The tackiness, strength, and flexibility of such sheets is dependent upon the type of asphalt used. By selecting high melting point asphalts, it is possible to produce films which are flexible and non-tacky but when these are desired the time of heating must be carefully controlled.

The thin flexible self-sustaining sheets or films produced by any of the methods described above are particularly adapted for use as a horticultural binding tape. When formed from a rubber-wax composition of the type described, the sheet or film material is practically moistureproof and waterproof, and if not vulcanized, has excellent heat sealing properties without being tacky at ordinary room or atmospheric temperatures. The sheet material may be either semitransparent or opaque, depending upon whether pigments or fillers are incorporated into the composition or not.

The horticultural tape made from our wax-rubber sheet material is highly flexible. In addition to this the sheet is capable of being stretched considerably; and after stretching it will tend to return to its original length although it will not fully regain its original length. At the same time the film has a certain degree of cohesion to itself when firmly pressed together, particularly if slight heat is applied. On the other hand the film can be made to stick to itself better by stretching out and then pressing firmly together while stretched, as, for example, when it is wound around an object such as the stems of a bouquet.

The tape particularly adapted for making up bouquets, for example, is one made from a wax of relatively low melting point such as 130°-2° F., and with a rubber content of say, 12 to 15%— the whole film being unvulcanized. Now if we use the same composition but vulcanize the tape we improve its properties in certain respects (as, for example, it has less tendency to contract with increasing heat and will retain its shape much better at higher temperatures) although at the same time it will not be quite as satisfactory for a bouquet of this type, due to the fact that it does not have as high a degree of adherence or sealing to itself.

We may also coat the surface of our sheet material with nitrocellulose lacquer or other suitable composition which will produce a flexible, adherent coating. When using a lacquer coating the gloss of the sheet is considerably enhanced. The coated sheet however will have a less degree of adherence and tackiness than the uncoated sheet. Upon stretching such coated sheet the coating film is broken thereby exposing the base film which will seal to itself when pressure is applied.

Our binding tape made from wax-rubber compositions is particularly adapted for numerous florists' uses as, for example, for wrapping around wreaths. In this case it is desired to keep moisture in certain parts of the wreath and the film can readily be wound around the desired portions of the wreath, direct from a wound roll. This is not only a matter of considerable convenience to the florist but also results in a floral arrangement having a high moisture retention and pleasing appearance, due to the fact that various colors of our product may be used. Our product is therefore admirably adapted for fancy tying ribbons on wreaths, particularly those which are to be exposed outdoors since they will withstand the action of the elements for suitable time.

Many other uses will readily suggest themselves. For example, the wires used for supporting bouquets and floral decorations may be wound conveniently with our wax-rubber film thereby enhancing the appearance of the finished product. Such use is illustrated in Figure 1 where the stem 10 of the flower is reinforced with wire 11 and completely wrapped with our film tape 12 thereby concealing the wire. A neat and artistic appearing display is thus produced. In Figure 4 the flowers 17 are supported on ordinary florists' wire 18 which are wrapped with our wax-rubber film containing green pigment thereby producing natural looking stems.

Various types of table decorations may be made since our film offers an opportunity for holding the flowers together and permitting new and novel designs. Figure 3, for example, illustrates a group of flowers 5 whose stems are wrapped into a single trunk 6 by means of our film thereby producing a very neat display.

On account of its beautiful colors, flexibility, stretchability, lustre, our film is particularly adapted for making artificial flowers. Figure 5 illustrates a stem 20 and flower 19 made from suitably colored wax-rubber film.

In general, we find that our film can be used in those places where metal foil has formerly been applied and with considerable improvement in the results. In keeping of certain more expensive flowers such as orchids, roses, and gardenias, our film is of especial value since tests have shown that the flowers will be preserved for a longer time. The film being moistureproof and waterproof prevents the loss of moisture from the flower stems when they are completely enclosed and sealed with our film thereby prolonging the life of the flowers. Figure 2 illustrates a shoulder bouquet made from gardenias 14. The stems 15 and 16 are wrapped with our film so as to completely enclose and seal them.

Our wax-rubber film also protects clothing from any staining which might come from wearing a bouquet; and at the same time the film itself will not cause any staining.

On account of the properties of sealing together and easy conformity to the object being wrapped our film offers a considerable saving in usage of material.

Our wax-rubber film also has a useful property of value to the florist in that if he desires a strip of width narrower than the roll being used it can be torn off quite readily since the film has a longitudinal grain direction.

We find also that our tape is well adapted for grafting purposes since it has the property of adhering to the grafted section, prevents the graft from separating, at the same time retains the sap in the graft. We may also use such composition for our tape that it will deteriorate in the light and fall off after the graft has become suitably incorporated.

When our tape is used for grafting purposes it may be suitably medicated to prevent growth of undesirable organisms. Our tape, as previously explained, is pressure sealing and forms air tight seals. The pressure exerted when applying it to a graft is uniform over the entire surface. It has considerable flexibility and thus obviates binding and restriction of circulation. Figure 6 illustrates a stock 22 and 21 the scion. Our flexible tape 23 is wound closely about the stock and scion so as to cover the joint and the cut end of the stock. The layers of the tape form a waterproof and elastic cover which prevents the evaporation of the sap. Our tape may be used similarly for other kinds of grafting.

While we have described a number of representative uses of our horticultural tape we do not restrict ourselves to those enumerated since many other uses will occur to the user and it is intended to include in our claims all horticultural and florists' uses for our novel tape material.

We claim:

1. A horticultural article having one or more portions of a living plant wrapped with a tape comprising a thermoplastic body portion and a suitable binder portion homogeneously admixed therewith so as to render the tape flexible and stretchable.

2. A horticultural article having one or more portions of a living plant wrapped with a tape comprising a flexible self-sustaining sheet of wax and rubber composition.

3. A horticultural article having one or more portions of a living plant wrapped with a tape comprising a flexible self-sustaining sheet of wax and rubber composition, having from at least 6 to 30% rubber.

4. A horticultural article having one or more portions of a living plant wrapped with a tape comprising a hardened solution of pale crepe rubber and paraffin-wax within the range of 6 to 30% rubber and 94% to 70% paraffin-wax by weight.

5. A horticultural article having one or more portions of a living plant wrapped with a tape comprising a hardened solution of 12 to 15% of pale crepe rubber and from 88 to 85% of paraffin-wax.

6. A horticultural article having one or more portions of a living plant wrapped with a tape comprising a homogeneous mixture of rubber, wax and a pigment.

7. A horticultural article having one or more portions of a living plant wrapped with a tape comprising a homogeneous mixture of rubber, wax and an age resistor.

8. A horticultural article having one or more portions of a living plant wrapped with a tape comprising a homogeneous mixture of rubber, wax and a photo chemical inhibitor.

9. A horticultural article having one or more portions of a living plant wrapped with a tape comprising rubber, wax, pigment and an age resistor.

10. A horticultural article having one or more portions of a living plant wrapped with a tape comprising a vulcanized composition of rubber and wax.

11. A horticultural article having one or more portions of a living plant wrapped with a tape comprising a vulcanized composition of pale crepe rubber and paraffin-wax.

12. A horticultural article having one or more portions of a living plant wrapped with a tape made of a vulcanized composition comprising from 6 to 30% of rubber and from 94 to 70% of paraffin-wax by weight.

13. A horticultural article having one or more portions of a living plant wrapped with a tape made of a vulcanized composition comprising rubber, wax, pigment and age resistor.

14. A horticultural article having one or more portions of a living plant wrapped with a tape made of a vulcanized composition comprising rubber, wax, and age resistor.

15. A horticultural article having one or more portions of a living plant wrapped with a tape made of a vulcanized composition comprising rubber, wax, and a pigment.

ALLEN ABRAMS.
CHARLEY L. WAGNER.
GEORGE W. FORCEY.